(12) United States Patent
Thirumala Aravamudan

(10) Patent No.: US 12,244,480 B2
(45) Date of Patent: Mar. 4, 2025

(54) METHODS, SYSTEMS, AND COMPUTER READABLE MEDIA FOR ACTIVE TESTING AND MONITORING A RADIO ACCESS NETWORK AND CORE NETWORK

(71) Applicant: Keysight Technologies, Inc., Santa Rosa, CA (US)

(72) Inventor: Muralidhar Thirumala Aravamudan, Ashburn, VA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 348 days.

(21) Appl. No.: 17/732,496

(22) Filed: Apr. 28, 2022

(65) Prior Publication Data

US 2023/0353473 A1 Nov. 2, 2023

(51) Int. Cl.
| | |
|---|---|
| *H04L 43/0888* | (2022.01) |
| *H04L 41/5019* | (2022.01) |
| *H04L 41/5067* | (2022.01) |
| *H04L 43/0852* | (2022.01) |
| *H04L 43/10* | (2022.01) |
| *H04L 43/12* | (2022.01) |
| *H04L 43/50* | (2022.01) |
| *H04W 24/02* | (2009.01) |

(52) U.S. Cl.
CPC ...... *H04L 43/0888* (2013.01); *H04L 41/5019* (2013.01); *H04L 41/5067* (2013.01); *H04L 43/0852* (2013.01); *H04L 43/10* (2013.01); *H04L 43/12* (2013.01); *H04L 43/50* (2013.01); *H04W 24/02* (2013.01)

(58) Field of Classification Search
CPC . H04L 43/0888; H04L 43/0852; H04L 43/10; H04L 43/12; H04L 43/50; H04L 41/5019; H04L 41/5067; H04W 24/02
See application file for complete search history.

(56) References Cited

U.S. PATENT DOCUMENTS 9,049,608 B2 * 6/2015 Chou ................ H04W 28/0865
9,185,001 B2    11/2015 Kakadia et al.
9,602,377 B2 * 3/2017 Agarwal ................ H04L 43/04
(Continued)

FOREIGN PATENT DOCUMENTS

KR        102163279 B1    10/2020

OTHER PUBLICATIONS

Rischke et al., "5G Campus Networks: A First Measurement Study," IEEE Access, vol. 9, pp. 1-18 (Aug. 27, 2021).

*Primary Examiner* — Redentor Pasia

(57) ABSTRACT

Methods, systems, and computer readable media for active testing and monitoring a radio access network and core network. An example system includes test probes placed in the network, including at least a first probe on a device configured for communicating on a radio access network of the network and a second probe in a data network of the network or coupled to the data network. The system includes a radio access test system configured for capturing one or more air interface measurements on the radio access network of the network. The system includes a test manager configured for executing a test script for active testing and monitoring of the network including attributing an end-to-end latency to the radio access network and the data network based on at least one air interface measurement from the radio access test system.

17 Claims, 6 Drawing Sheets

(56) References Cited

U.S. PATENT DOCUMENTS

| | | | |
|---|---|---|---|
| 11,234,157 B2* | 1/2022 | Lekutai | H04W 40/20 |
| 2011/0170433 A1* | 7/2011 | Scobbie | H04L 43/0829 |
| | | | 370/252 |
| 2013/0100843 A1* | 4/2013 | Croak | H04L 43/106 |
| | | | 370/252 |
| 2013/0222515 A1* | 8/2013 | Abuan | H04L 45/306 |
| | | | 348/14.01 |
| 2014/0160971 A1* | 6/2014 | Ketonen | H04L 43/00 |
| | | | 370/252 |
| 2015/0003435 A1* | 1/2015 | Horn | H04L 5/0058 |
| | | | 370/338 |
| 2017/0048744 A1* | 2/2017 | Egner | H04W 28/0268 |
| 2017/0207976 A1* | 7/2017 | Rovner | H04L 43/16 |
| 2021/0274366 A1 | 9/2021 | Yao et al. | |
| 2023/0208734 A1* | 6/2023 | Bothe | H04L 43/087 |
| | | | 709/224 |

* cited by examiner

METHODS, SYSTEMS, AND COMPUTER READABLE MEDIA FOR ACTIVE TESTING AND MONITORING A RADIO ACCESS NETWORK AND CORE NETWORK

TECHNICAL FIELD

The subject matter described herein relates to network testing. More specifically, the subject matter relates to methods, systems, and computer readable media for active testing and monitoring a radio access network and core network.

BACKGROUND

Telecommunications network providers, hyperscalers, and system integrators are building complex 5G networks. These networks are customized networks built to host, for example, factory application that are sensitive to performance issues such as high latency or failure to uphold a service level agreement (SLA). Building these kinds of private networks can involve significant infrastructural changes in the network.

In some cases, performance bottlenecks can be scattered to various points within the infrastructure. Wireless signal strength and interference issues can impact the speed of data transfer. Network components experiencing processor overload issues can lead to slow data processing time. Bandwidth issues, for example, in the data network on or the air interface, can create congestion in the network. Router configuration issues can lead to delays in transmission.

Accordingly, a need exists for methods, systems, and computer readable media for active testing and monitoring a 5G radio access network and core network.

SUMMARY

Methods, systems, and computer readable media for active testing and monitoring a radio access network and core network. An example system includes test probes placed in the network, including at least a first probe on a device configured for communicating on a radio access network of the network and a second probe in a data network of the network or coupled to the data network. The system includes a radio access test system configured for capturing one or more air interface measurements on the radio access network of the network.

The system includes a test manager configured for executing a test script for active testing and monitoring of the network including: generating and sending test traffic from the first probe to the second probe; determining a measure of end-to-end latency for the test traffic based on timing information from the first probe and the second probe; receiving at least one air interface measurement from the radio access test system; and attributing the end-to-end latency to the radio access network and the data network based on the at least one air interface measurement from the radio access test system. The test manager can be configured for outputting a report based on attributing the end-to-end latency and for monitoring the network by repeatedly active testing the network.

In some examples, the radio access test system is installed on the device configured for communicating on the radio access network. In some examples, the second probe is installed on a server coupled to the data network.

In some examples, attributing the end-to-end latency comprises attributing all of the end-to-end latency to an impairment to the radio access network. In some examples, attributing the end-to-end latency comprises attributing all of the end-to-end latency to an impairment to the data network. In some examples, attributing the end-to-end latency comprises attributing a portion of the end-to-end latency to the radio access network based on the at least one air interface measurement and attributing the remainder of the end-to-end latency to the data network.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to a physical computer platform including one or more processors, network interfaces, and memory.

As used herein, each of the terms 'function', 'engine', and 'module' refers to hardware, which may also include software and/or firmware, for implementing the feature(s) being described.

BRIEF DESCRIPTION OF THE DRAWINGS

The subject matter described herein will now be explained with reference to the accompanying drawings of which.

DETAILED DESCRIPTION

This document describes methods, systems, and computer readable media for active testing and monitoring test probes placed in a radio access network (RAN) and core network. In some examples, a RAN visibility tool is combined with a core network testing tool to create a RAN-to-core private network infrastructure maintenance and performance monitoring solution. In some examples, the methods, systems, and computer readable media enable network infrastructure maintenance, performance monitoring, and performance diagnosis of telecommunications networks through the placement of active testing and monitoring probes in the RAN and Core Network and using an analytics platform to detect and diagnose performance problems.

Figure 1:
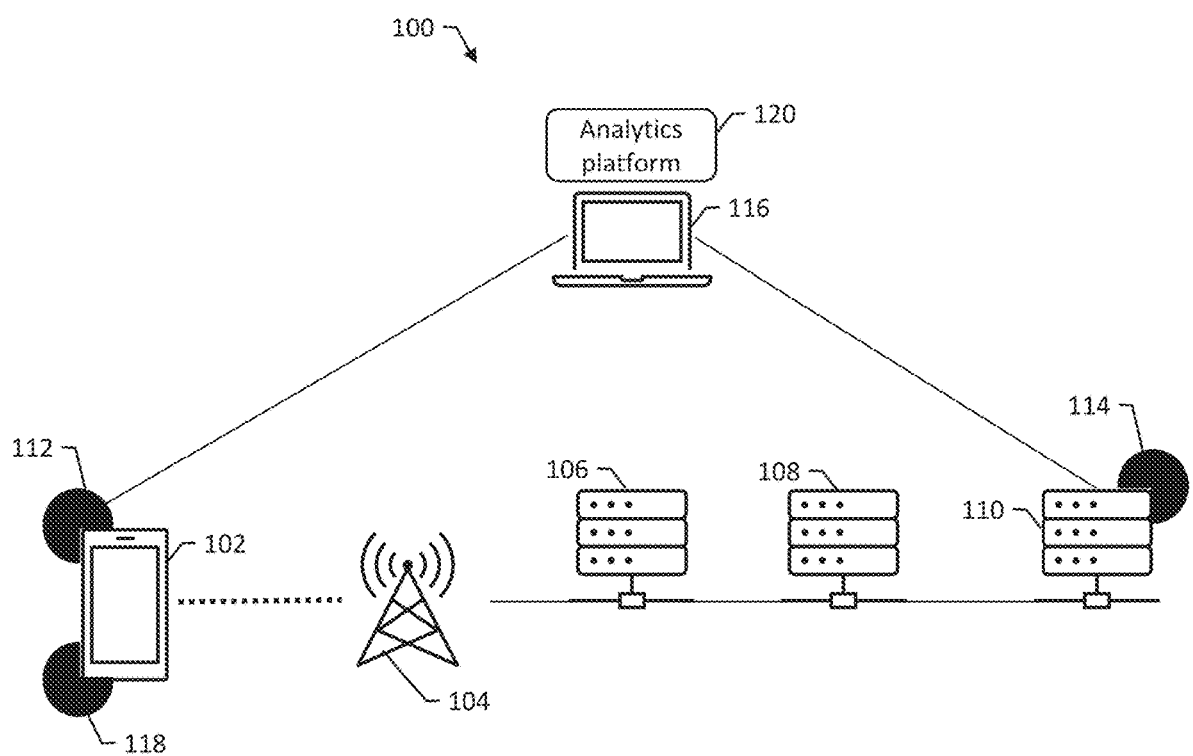
FIG. 1 is a block diagram illustrating an example 5G network being tested by active testing and monitoring of test probes.

FIG. 1 is a block diagram illustrating an example telecommunications network 100 being tested by active testing and monitoring of test probes. The network 100 can be, e.g., a 4G or 5G network. A device 102 accesses the network 100 by way of a RAN, e.g., through a 5G radio access node 104 such as a gNodeB. The radio access node 104 is connected, e.g., by the N3 interface, to a user plane function (UPF) 106.

The UPF 106 provides the interconnect point between the mobile infrastructure and a data network 108, e.g., by performing encapsulation and decapsulation of general packet radio service (GPRS) tunneling protocol for the user plane (GTP-U) on the N6 interface. The UPF 106 can provide various other services such as providing mobility within and between radio access technologies (RATs), including sending one or more end marker packets to the gNB 104.

The data network 108 can be, or can include, a core network. The data network 108 connects to an example server 110. The example server 110 can be, e.g., a cloud computing system providing services to the device 102.

To perform active testing and monitoring, at least two test probes 112 and 114 are deployed in the network 100. The test probes 112 and 114 are in communication with a test manager 116. The test manager 116 is a computer system programmed to execute one or more test scripts for active testing and monitoring of the network 100. In general, active testing includes generating test packets at one of the test probes and receiving the test packets at the other test probe and recording one or more test statistics based on the received packets, e.g., latency, error rate, drop rate, and the like.

The test manager 116 can be implemented in any appropriate type of computing system. For example, the test manager 116 can be implemented on a computer remote from the network 100 (e.g., on a remote cloud computing system), or on one of the computer system on the network 100. In some examples, the test manager 116 is implemented on a computer system with a display device, and the test manager 116 can display test results on the display device.

The test manager 116 can be, for example, the Hawkeye test system produced by Keysight®. The test manager 116 can be configured for active monitoring to:
perform real-time QoS monitoring
validate deployments by simulating live network traffic
monitor distributed networks from core to edge In some examples, the test manager 116 includes, or is connected to, an analytics platform 120. The analytics platform 120 can further:
Detect, diagnose, and fix performance problems.
Diagnose outages faster with hop-by-hop visualization.
Use, e.g., artificial intelligence/machine learning based algorithms to diagnose problems.
Correlate reports from multiple measurement probes.
Isolate issues between radio and data network.

The test probes 112 and 114 can be, for example, hardware or software probes running on a device or a remote site. As shown in the example of FIG. 1, the first test probe 112 is executing on the device 102 and the second test probe 114 is executing on the server 110. With test probes deployed properly, the test manager 116 can be configured to enable a network operator to:
measure user experience across your network and applications in real time
conduct distributed tests from on-premises or off-premises infrastructure
verify fixes in real-time with pass/fail metrics
find network and application issues faster with automated interval testing
track network trends proactively based on time-of-day and day-of-week of services The device 102 also executes a radio access test system 118 (e.g., a software application for radio network testing) configured for capturing air interface measurements and signaling. The radio access test system 118 can be, for example, the Nemo Handy test system produced by Keysight®. The radio access test system 118 can provide advanced measurement and optimization of wireless air interface and mobile application Quality-of-Service (QoS) and Quality-of-Experience (QoE). The radio access test system 118 can be used for performing measurements both outdoors and in busy, crowded indoor spaces while allowing the device 102 to be used simultaneously as a regular mobile phone.

The radio access test system 118 can provide real-time measurement visualization. In addition to real-time displays, radio frequency (RF) and signaling data can be logged to the internal storage of the device 102. Log files can be transmitted in a specified file format for easy post-processing.

In some examples, the radio access test system 118 can verify the end-user QoE (Quality of Experience) with one or more of the following data-testing capabilities:
voice call testing, voice quality testing, FTP and HTTP data transfer testing, HTML browsing, email testing, Iperf testing, TWAMP testing, ping testing, SMS & MMS messaging testing, external application launch testing, mScore testing, and video quality testing
social media testing apps/protocols, including YouTube video streaming, Facebook testing, Twitter testing, LinkedIn testing, Instagram testing, Dropbox testing, Google Drive testing, WhatsApp testing, Line testing, BiP Messenger testing, and Viber testing.

The radio access test system 118 can collect metrics such as random-access channel (RACH) information, TX power, rank (MIMO mode), modulation, MAC throughput and BLER, signal strength, and quality metrics of the SSB beams. In addition, the radio access test system 118 can collect QoS measurements including throughput and latency.

In operation, the test manager 116 executes a test script by initiating tests from the test probes 112 and 114 and from the radio access test system 118. For example, the first test probe 112 can generate network traffic and transit the traffic to test probe 114, while the radio access test system 118 monitors the radio network. The test manager 116 (e.g., using the analytics platform 120) measures the end-to-end latency and determines any impairment on the radio network, e.g., by receiving a report from the radio access test system 118. The test manager 116 (e.g., using the analytics platform 120) then isolates the reasons for any high latency (e.g., latency above a threshold) between the radio network and the data network.

In some examples, the test manager 116 measures the end-to-end latency using the analytics platform 120 that is connected to or integrated with the test manager 116. The analytics platform 120 can be configured for isolating the reasons for any high latency between the radio network and the data network.

In general, isolating the reasons for high latency includes attributing a portion of the latency to delays in the radio network. If the radio network testing indicates that the radio network is operating as specified, i.e., with no unexpected latency, then the end-to-end latency can be attributed to the data network.

If the radio network testing indicates that the radio network is impaired and the impairment is significant enough to cause the entire end-to-end latency, then none of the end-to-end latency should be attributed to the data network. In cases where the radio network testing indicates that the radio network is impaired but not enough to cause the entire end-to-end latency, then a fraction of the end-to-end latency can be attributed to the radio network and another fraction of the end-to-end latency can be attributed to the data network.

The test system 116 can be configured to monitor the network 100 by repeatedly performing active testing and producing reports resulting from the tests. For example, the test system 116 can execute a test script at regularly timed intervals.

Figure 2:
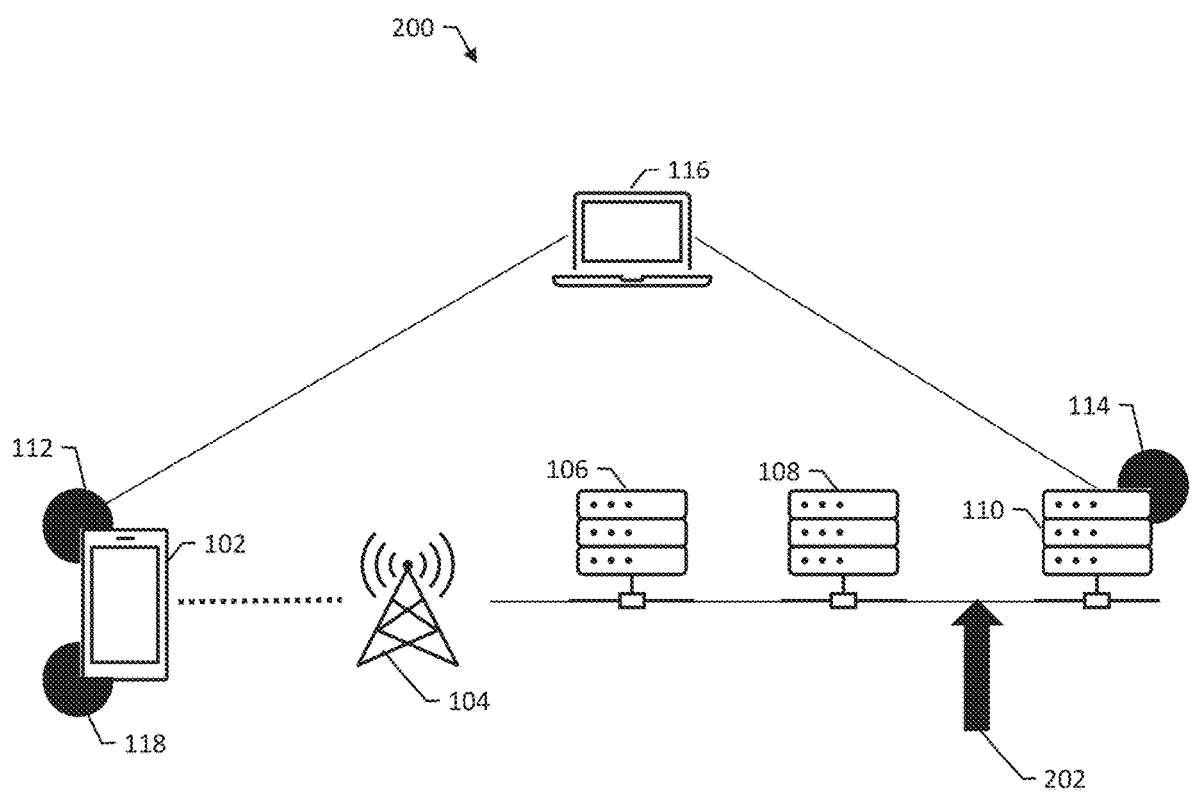
FIG. 2 is a block diagram of an example network experiencing an impairment in the data network.

FIG. 2 is a block diagram of an example network 200 experiencing an impairment 202 in the data network. The test manager 116 initiates a test by causing the first test probe 112 to generate and send packets to the server 110. The second test probe 114 reports receipt timing of the received packets to the test manager 116, and the radio access test system 118 reports one or more radio network conditions to the test manager 116.

The test manager 116 determines end-to-end latency of each packet based on the send time reported by the first test probe 112 and the receipt time reported by the second test probe 114. The test manager 116 can determine a representative latency for the test (e.g., an average latency or the median latency or the highest latency) and determine whether the latency exceeds a threshold.

If the latency exceeds a threshold, the test manager 116 (and/or the analytics platform 120) isolates the reason for the high latency (e.g., latency above a threshold) between the radio network and the data network using the report from the radio access test system 118. In this case, the report from the radio access test system 118 indicates that the radio network was not impaired or only minimally impaired. The test manager 116 then attributes the latency to the data network.

Figure 3:
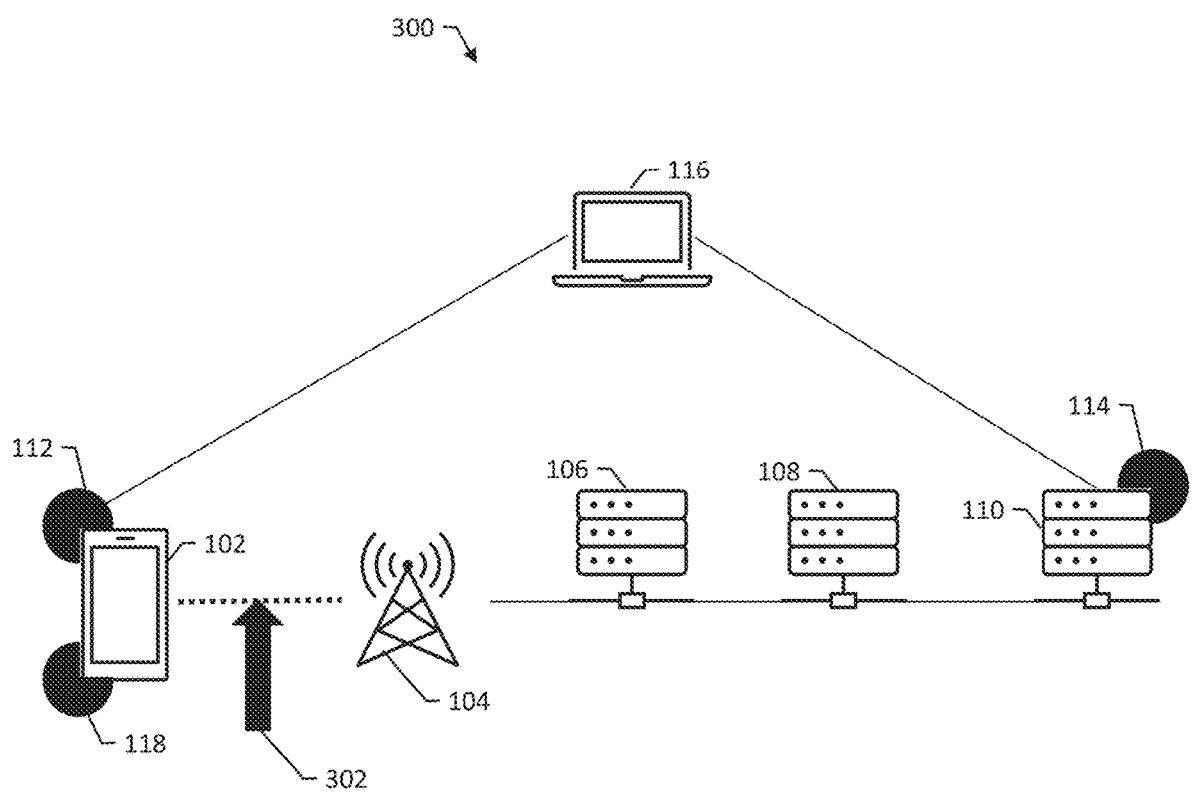
FIG. 3 is a block diagram of an example network experiencing an impairment in the radio network.

FIG. 3 is a block diagram of an example network 300 experiencing an impairment 302 in the radio network. The test manager 116 initiates a test by causing the first test probe 112 to generate and send packets to the server 110. The second test probe 114 reports receipt timing of the received packets to the test manager 116, and the radio access test system 118 reports one or more radio network conditions to the test manager 116.

The test manager 116 determines end-to-end latency of each packet based on the send time reported by the first test probe 112 and the receipt time reported by the second test probe 114. The test manager 116 can determine a representative latency for the test (e.g., an average latency or the median latency or the highest latency) and determine whether the latency exceeds a threshold.

If the latency exceeds a threshold, the test manager 116 isolates the reason for the high latency (e.g., latency above a threshold) between the radio network and the data network using the report from the radio access test system 118. In this case, the report from the radio access test system 118 indicates that the radio network was significantly impaired. The test manager 116 (e.g., using the analytics platform 120) determines that the impairment 302 was sufficient to account for the end-to-end latency and then attributes the latency to the radio network.

Figure 4:
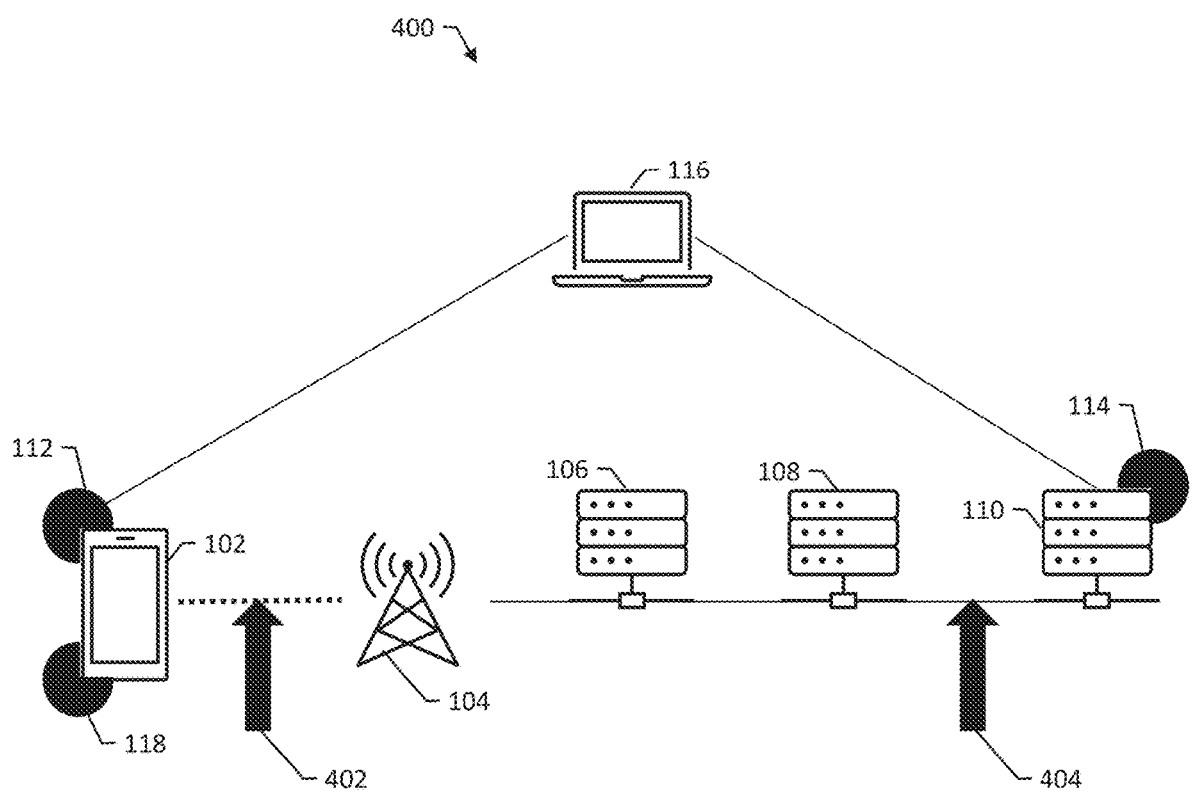
FIG. 4 is a block diagram of an example network experiencing an impairment in the radio network and an impairment in the data network.

FIG. 4 is a block diagram of an example network 400 experiencing an impairment 402 in the radio network and an impairment 404 in the data network. The test manager 116 initiates a test by causing the first test probe 112 to generate and send packets to the server 110. The second test probe 114 reports receipt timing of the received packets to the test manager 116, and the radio access test system 118 reports one or more radio network conditions to the test manager 116.

The test manager 116 determines end-to-end latency of each packet based on the send time reported by the first test probe 112 and the receipt time reported by the second test probe 114. The test manager 116 can determine a representative latency for the test (e.g., an average latency or the median latency or the highest latency) and determine whether the latency exceeds a threshold.

If the latency exceeds a threshold, the test manager 116 isolates the reason for the high latency (e.g., latency above a threshold) between the radio network and the data network using the report from the radio access test system 118. In this case, the report from the radio access test system 118 indicates that the radio network was impaired. The test manager 116 determines that the impairment 402 on the radio network was sufficient to account for some, but not all, of the end-to-end latency, and therefore the impairment 404 on the data network accounts for the remainder of the latency. The test manager 116 attributes a portion of the latency to the radio network based on the report from the radio access test system 118 and attributes the remainder of the latency to the data network.

Figure 5:
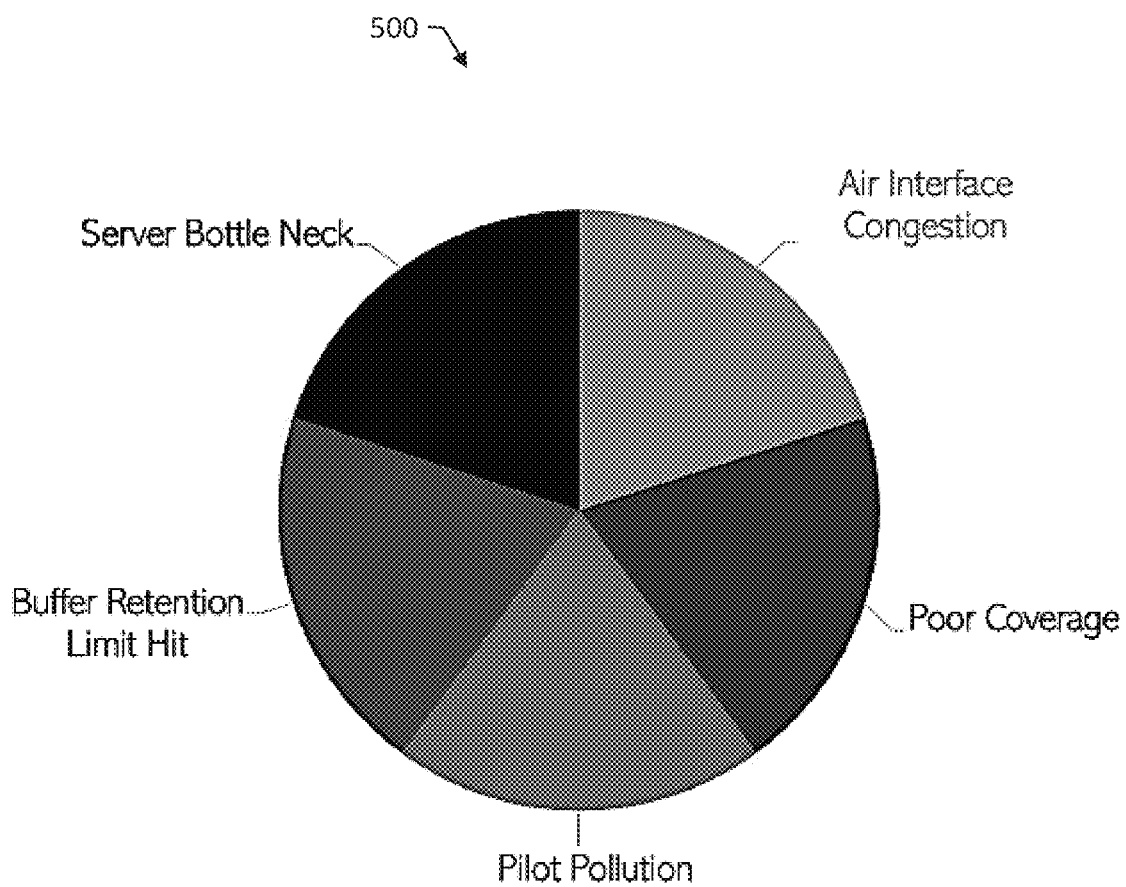
FIG. 5 is an example test results screen.

FIG. 5 is an example test results screen 500 that can be displayed by the test manager 116 and/or the analytics platform 120, e.g., within a graphical user interface (GUI) for the test manager 116 and/or the analytics platform 120. The test results screen 500 shows a pie chart that attributes a measured end-to-end latency to various causes that can be identified across the network. Different causes of latency can be identified by placing different test probes across the network, performing active testing from those test probes, and attributing latency to portions of the network between those probes. As shown in FIG. 5, a measured latency was attributed to a server bottleneck, air interface congestion, poor coverage, pilot pollution, and buffer retention limit hit.

Figure 6:
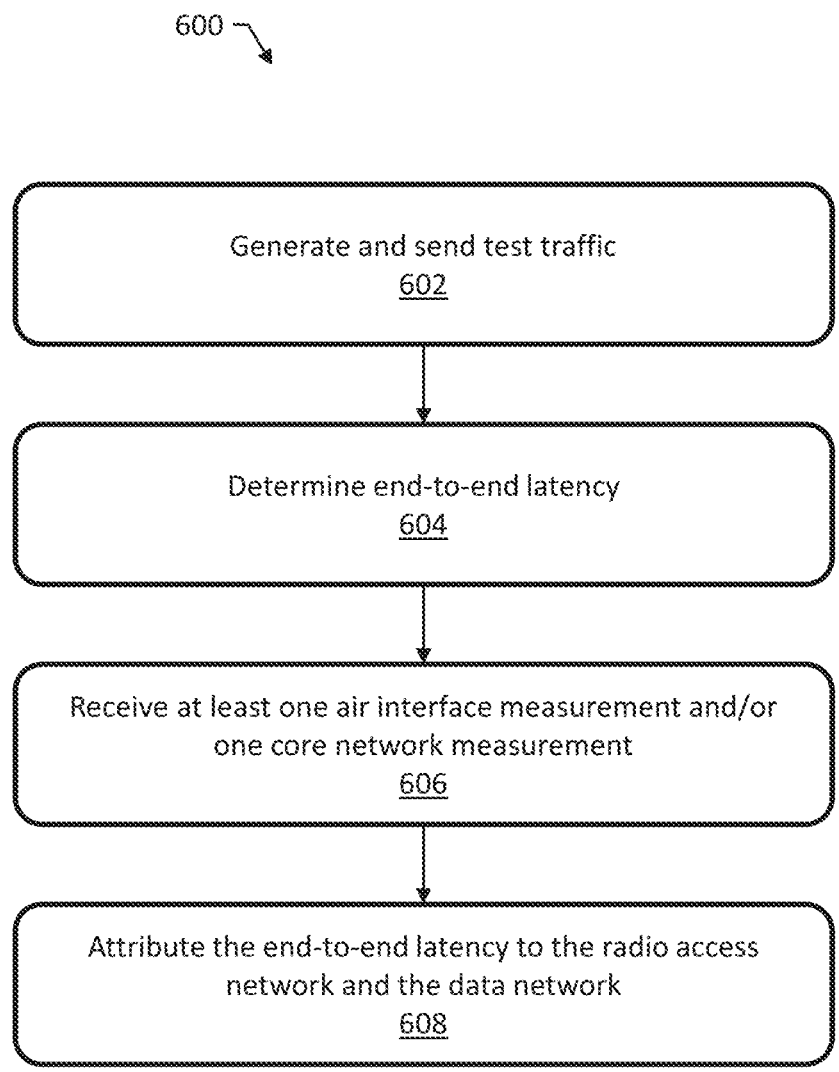
FIG. 6 is a flow diagram of an example method for active testing and monitoring a 5G network.

FIG. 6 is a flow diagram of an example method 600 for active testing and monitoring a 5G network. The method 600 can be performed, for example, by the test manager 116 of FIG. 1, e.g., using the analytics system 120 of FIG. 1.

The method 600 includes generating and sending test traffic from a first probe to a second probe (602). The first and second probes are placed in the 5G network. The first probe is on a device configured for communicating on a radio access network of the 5G network. The second probe is in a data network of the 5G network or coupled to the data network. For example, the second probe can be installed on a server coupled to the data network.

The method 600 includes determining a measure of end-to-end latency for the test traffic based on timing information from the first probe and the second probe (604). For example, the method 600 can include determining the average latency of a number of packets in the test traffic.

Determining a measure of end-to-end latency is an example of one such measurement that can be performed using the test system. Other examples of measurements that can be performed include:

Throughput
One-way delay
Packet loss rate
Mean opinion score (MOS)
Jitter

The method 600 includes receiving at least one air interface measurement from a radio access test system and/or one core network measurement, e.g., a transport network measurement from a probe placed in the data network (606). For example, the method 600 can include receiving a measure of latency on the air interface. The radio access test system can be installed on the device configured for communicating on the radio access network.

The method 600 includes attributing, e.g., using an analytics platform, the end-to-end latency to the radio access network and the data network based on the at least one air interface measurement from the radio access test system and/or a measurement from the core network (608). For example, attributing the end-to-end latency can include attributing all of the end-to-end latency to an impairment to the radio access network. Attributing the end-to-end latency can include attributing all of the end-to-end latency to an impairment to the data network. Attributing the end-to-end latency can include attributing a portion of the end-to-end latency to the radio access network based on the at least one air interface measurement and attributing the remainder of the end-to-end latency to the data network In some examples, the method 600 includes outputting a report based on attributing the end-to-end latency and for monitoring the 5G network by repeatedly active testing the 5G network. For example, the method 600 can include displaying the attributions on a display screen. In some examples, outputting the report includes outputting a diagnostic report that attributes the reason for high end-to-end latency either to the radio or to the core network.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A system for active testing and monitoring a network, the system comprising:
   a plurality of test probes configured to send and receive test traffic in the network, including at least a first probe on a device configured for communicating on a radio access network of the network and a second probe in a data network of the network or coupled to the data network, the device configured for communicating on the radio access network comprises a mobile phone, and the first probe executes on the mobile phone;
   a radio access test system configured to execute on the mobile phone for capturing one or more air interface measurements on the radio access network of the network, wherein the one or more air interface measurements includes a measure of latency on an air interface; and
   a test manager configured for executing a test script for active testing and monitoring of the network including:
      generating and sending test traffic from the first probe to the second probe;
      determining a measure of end-to-end latency for the test traffic based on timing information from the first probe and the second probe;
      receiving at least one air interface measurement from the radio access test system executing on the mobile phone; and
      attributing a first portion of the end-to-end latency to the radio access network and a second portion of the end-to-end latency to the data network based on the at least one air interface measurement from the radio access test system executing on the mobile phone.

2. The system of claim 1, wherein the second probe is installed on a server coupled to the data network.

3. The system of claim 1, wherein attributing the first portion of the end-to-end latency to the radio access network comprises attributing all of the end-to-end latency to an impairment to the radio access network.

4. The system of claim 1, wherein attributing the second portion of the end-to-end latency to the data network comprises attributing all of the end-to-end latency to an impairment to the data network.

5. The system of claim 1, wherein the second portion of the end-to-end latency comprises a remainder of the end-to-end latency after allocating the first portion of the end-to-end latency to the radio access network.

6. The system of claim 1, wherein test manager is configured for outputting a report based on attributing the end-to-end latency and for monitoring the network by repeatedly active testing the network.

7. A method for active testing and monitoring a network, the method comprising:
   generating and sending test traffic from a first probe to a second probe, wherein the first and second probes are placed in the network and the first probe is on a device configured for communicating on a radio access network of the network and the second probe is in a data network of the network or coupled to the data network, the device configured for communicating on the radio access network comprises a mobile phone, and the first probe executes on the mobile phone;
   determining a measure of end-to-end latency for the test traffic based on timing information from the first probe and the second probe;
   capturing, by a radio access test system executing on the mobile phone, at least one air interface measurement on the radio access network, wherein the at least one air interface measurement includes a measure of latency on an air interface;
   receiving the at least one air interface measurement from the radio access test system executing on the mobile phone; and
   attributing a first portion of the end-to-end latency to the radio access network and a second portion of the end-to-end latency to the data network based on the at least one air interface measurement from the radio access test system executing on the mobile phone.

8. The method of claim 7, wherein the second probe is installed on a server coupled to the data network.

9. The method of claim 7, wherein attributing the first portion of the end-to-end latency to the radio access network comprises attributing all of the end-to-end latency to an impairment to the radio access network.

10. The method of claim 7, wherein attributing the second portion of the end-to-end latency to the data network comprises attributing all of the end-to-end latency to an impairment to the data network.

11. The method of claim 7, wherein the second portion of the end-to-end latency comprises a remainder of the end-to-end latency after allocating the first portion of the end-to-end latency to the radio access network.

12. The method of claim 7, comprising outputting a report based on attributing the end-to-end latency and for monitoring the network by repeatedly active testing the network.

13. A non-transitory computer readable medium comprising computer executable instructions embodied in the non-transitory computer readable medium that when executed by at least one processor of at least one computer cause the at least one computer to perform steps comprising:

generating and sending test traffic from a first probe to a second probe, wherein the first and second probes are placed in the network and the first probe is on a device configured for communicating on a radio access network of the network and the second probe is in a data network of the network or coupled to the data network, the device configured for communicating on the radio access network comprises a mobile phone, and the first probe executes on the mobile phone;

determining a measure of end-to-end latency for the test traffic based on timing information from the first probe and the second probe;

capturing, by a radio access test system executing on the mobile phone at least one air interface measurement on the radio access network, wherein the at least one air interface measurement includes a measure of latency on an air interface;

receiving the at least one air interface measurement from the radio access test system executing on the mobile phone; and attributing a first portion of the end-to-end latency to the radio access network and a second portion of the end-to-end latency to the data network based on the at least one air interface measurement from the radio access test system executing on the mobile phone.

14. The non-transitory computer readable medium of claim 13, wherein the second probe is installed on a server coupled to the data network.

15. The non-transitory computer readable medium of claim 13, wherein attributing the first portion of the end-to-end latency to the radio access network comprises attributing all of the end-to-end latency to an impairment to the radio access network.

16. The non-transitory computer readable medium of claim 13, wherein attributing the second portion of the end-to-end latency to the data network comprises attributing all of the end-to-end latency to an impairment to the data network.

17. The non-transitory computer readable medium of claim 13, wherein the second portion of the end-to-end latency comprises a remainder of the end-to-end latency after allocating the first portion of the end-to-end latency to the radio access network.

* * * * *